United States Patent [19]

Lanza et al.

[11] 4,135,091
[45] Jan. 16, 1979

[54] DIAGNOSTIC X-RAY IMAGING SYSTEM

[75] Inventors: Richard C. Lanza; A. Robert Sohval, both of Cambridge, Mass.

[73] Assignee: Butler-Newton, Inc., Newton, Mass.

[21] Appl. No.: 808,515

[22] Filed: Jun. 20, 1977

[51] Int. Cl.² .............................................. G01T 1/00
[52] U.S. Cl. .................................... 250/336; 250/394
[58] Field of Search .................... 250/336, 363 S, 393, 250/394, 395, 370

[56] References Cited

U.S. PATENT DOCUMENTS 4,037,102   7/1977   Hoyle et al. .......................... 250/370

Primary Examiner—Davis L. Willis
Attorney, Agent, or Firm—Cesari and McKenna

[57] ABSTRACT

A radiation imaging system employs a superheated, superconducting colloid detector subjected to an external magnetic field so that the colloid grains are maintained in a metastable superconducting state in the absence of radiation. Intersecting sets of select wires are imbedded in the detector that divide the detector into volumetric resolution elements. Grains in each resolution element that absorb photons emanating from an object "flip" to the normal conducting state. By applying coincident currents to the select wires defining each element, a local magnetic field is produced that opposes the external field so that all the "flipped" grains are reset to the superconducting state. This produces a flux change proportional to the number of photons incident on that element which is sensed and used to develop an x-ray image of the object.

12 Claims, 4 Drawing Figures

DIAGNOSTIC X-RAY IMAGING SYSTEM

BACKGROUND OF THE INVENTION

This invention relates to a diagnostic x-ray imaging system. It relates more particularly to an improved large area radiation detector for use in such a system.

In diagnostic x-ray applications, a patient is illuminated by a beam of x-rays or gamma rays. Upon passing through the patient's body, some of the photons in the beam are absorbed, others are not, depending upon the densities of the tissues, bones, fluids, etc. along the tracks followed by the photons through the body. Thus the radiation pattern emerging from the patient's body can be used to produce an image indicating the composition of the body along the path of the radiation beam. This image can be reduced to visible form by exposing a film to the emergent radiation or by exposing an array of photo detectors which develop electrical signals corresponding to the emergent radiation to produce an electronic display of the body image.

The photosensitive coating on the film is quite thin and the photosensitive grains themselves are not very dense. Consequently only a relatively small percentage of the incident photons interact with the film to produce the resultant image. These factors also contribute to the relatively large radiation dosage required to produce an acceptable picture in prior apparatus.

This problem is somewhat alleviated through the use of film-screen combinations in which an intensifying screen which converts x-rays to light is placed in contact with the photosensitive film. Since the screen absorbs a greater fraction of x-rays than the film, the quantum detection efficiency is raised and the required radiation dose is lowered. However, this device suffers from the following drawback. It cannot be known that a particular image is satisfactory until after the film has been developed. This takes an appreciable amount of time during which the patient must remain available in case additional pictures are required. Needless to say, this is annoying to the patient. Also, it slows down the processing of patients through the radiology laboratory. Furthermore, if the image is unsatisfactory, the exposure may have to be repeated, thus increasing the radiation dose to the patient.

The prior systems that produce radiation images electronically have tended to be relatively complex and expensive and limited in sensitive area.

Recently there has been developed a radiation detector employing a so-called superheated, superconducting colloid (SSC). Basically, the detector comprises a colloid body composed of small grains of a dense superconducting material suspended in a less dense binder. The body is subjected to a low temperature and an external magnetic field that maintains the grains in a metastable superconducting state in the absence of radiation. When a grain is impacted by a photon, it undergoes a transition from the metastable superconducting state to the normal conducting state. This transition produces a magnetic flux change in the region of the grain and the flux change is detected by a sensing coil on the surface of the body that has at least one loop encircling the grain in question. As each grain within that loop changes to its normal conducting state in response to an incident photon, a voltage pulse is developed in the sensing coil reflecting that change. Consequently the number of pulses detected provides an indication of the intensity of the radiation incident on the detector. A detector such as this is disclosed, for example, in French Pat. Nos. 7536494 and 7536495.

Until now, however, the so-called SSC detectors have had relatively low quantum detection efficiency and small surface area. Therefore, they have not been used in nuclear medicine or radiology applications. These problems stem from the fact that the usual SSC detector is relatively thin (e.g. 1 mm). Therefore a relatively high percentage of the incident photons do not have an opportunity to interact with, and be absorbed by, the colloid grains in the detector. It is no solution to increase the thickness of the usual SCC detector because a sensing coil in the detector having a width W which defines the spatial resolution responds to flux changes produced only by those grains which reside within a distance of approximately W/2 above or below the plane of the coil. Therefore a sensing coil on the surface of the typical colloid body does not detect photon interactions with grains near the center of the body. Likewise, a coil imbedded in the body may not detect events occurring near the surfaces of the body. Thus even though more photons may interact with the detector grains, many of these interactions would not be detected by the sensing coil so that there would be no net gain in quantum detection efficiency or resolution. Thus, in order to obtain an image of the object being irradiated with the prior SSC detectors, a relatively long period of exposure would still be required, presenting a potential health hazard in the case of animals and humans.

SUMMARY OF THE INVENTION

Accordingly it is the object of the present invention to provide an improved radiation imaging system for use particularly in diagnostic radiology applications in which the instantaneous photon fluxes are quite high.

A further object of the invention is to provide a detector for such a system that has a large surface area so that it can produce an image of a large body organ at one time.

A further object of the invention is to provide a detector of this type which is monolithic and relatively rigid so that it requires no special mountings or fixtures to maintain it in a planar state.

Yet another object of the invention is to provide an imaging system such as this which can be made nonresponsive to incident radiation that has previously been scattered and so which could degrade the resultant image.

A further object of the invention is to provide an x-ray imaging system which has a high quantum detection efficiency and which therefore requires a minimum amount of incident radiation to produce an acceptable picture.

Still another object is to provide an x-ray imaging system that produces a high quality, high resolution image in a minimum amount of time.

Another object is to provide an x-ray image which encompasses a wide dynamic range of detected x-rays per resolution element.

A further object is to provide a detector for such a system that accumulates and stores radiation intensity information until directed to read out that information to produce an image.

A further object is to provide a storable detector such as this which can be erased.

Other objects will, in part, be obvious and will, in part, appear hereinafter.

The invention accordingly comprises the features of construction, combination of elements and arrangement of parts as will be exemplified in the following detailed description, and the scope of the invention will be indicated in the claims.

Briefly, our diagnostic imaging system comprises a radiation detector in the form of an SSC body subjected to a low temperature and an external magnetic field that maintains the colloid grains in a metastable superconducting state in the absence of radiation. The surface area of the body illuminated by radiation is relatively large and the body is thick enough so that substantially all of the incident photons upon entering the body are absorbed by one or another of its grains. Imbedded in the body are intersecting sets of narrow, elongated select wires that divide the body along its length and width into a multiplicity of resolution elements. Furthermore each set of wires extends the full height or thickness of the body so that the wires extending in one direction are interlaced with the wires extending in another direction. In other words, each select wire in each set is actually a stack of many wires positioned one over the other with the stack extending the full thickness of the body and with the wires in each stack being electrically connected in parallel. Resultantly each resolution element is a volume extending the full thickness of the body and bounded by two pairs of select wire stacks, one from each set and is filled with colloid grains. Desirably, the number of wires and the distance between the wires in each set are such that each colloid grain in each resolution element is within a distance of W/2 from a wire pair plane where W is the distance between adjacent parallel wires in one plane.

The select wires are connected by way of a set of conventional select gates to a source of current. By properly addressing the select gates, an adjacent pair of "X" wires and an adjacent pair of "Y" wires uniquely defining the coordinates of any resolution element in the body can be selected for connection to the current source so that current flows simultaneously only through those two pairs of selected wires. The effect of the two pairs of wires being actually stacks of wires extending the full height or thickness of the SSC body is to produce four sheets of electric current extending the full thickness of the body and defining a resolution element that is a volume in the body. The direction of current flow through the sheets is such as to produce a solenoid local magnetic field exclusively in the resolution element defined by the selected pairs of wires that opposes or bucks the external magnetic field.

When an x-ray or gamma ray photon passes into the detector volume, it normally interacts with, and is absorbed by, a colloid grain in one of the resolution elements. There is an energy transfer from the photon to the grain causing the temperature of the grain to rise above the critical temperature above which it can no longer remain superconducting. Resultantly, the grain undergoes a transition or "flip" to the normal conducting state which is accompanied by a change in its magnetic permeability.

Other incident photons interact with other grains in the detector body in the same fashion so that after a period of time, each resolution element in the detector contains a number of "flipped" normally conducting grains, the specific number of such "flipped" grains being dependent upon the intensity of the radiation illuminating that resolution element. Therefore the pattern of the "flipped" grains across the entire detector body represents a latent x-ray image of the organ or object through which the radiation passes before illuminating the detector. This information can remain stored in the detector indefinitely or it may be read out immediately for display or other purposes.

In the latter event, the resolution elements in the detector are interrogated in sequence by appropriately addressing the select gates to apply coincident current pulses, in turn, to the unique pairs of select wires defining the resolution elements. The coincident currents in the pair of wires defining each selected resolution element produce a local magnetic field which opposes the external field resulting in a net field at the selected resolution element which is less than that required to maintain the previously "flipped" grains in their normal conducting state. Resultantly, all of these grains revert to their superconducting state producing a local magnetic flux change at the selected resolution element. One or more sensing coils are provided on or in the detector body. The local flux change induces a voltage pulse in a sensing cell which is digitized and stored in the computer memory. The strength of the induced signal is proportional to the number of grains in the selected resolution element that previously made a transition from the superconducting to the normal conducting state. That number, in turn, corresponds to the number of photons which illuminated the selected resolution element.

The computer memory may be a standard random access memory having a memory location corresponding to each resolution element in the detector. As the wire pair defining each resolution element is addressed or selected by the select gates, the digitized signal representing the intensity of the radiation illuminating that resolution element is stored in the corresponding memory location in the computer. When the information from all of the resolution elements has been processed in this fashion, the data in the computer can be used to control an electronic display to provide an x-ray image of the organ or object being examined.

In a system such as this employing an SSC detector, the energy required to cause a transition of a colloid grain from its superconducting to its normal conducting state depends upon the size of the grain and the strength of the external magnetic field. Thus for a given grain size, by varying the external field strength, the threshold energy can be varied accordingly. This provides a convenient way to make the system unresponsive to photons that have been scattered upon passing through the object being examined and which tend to degrade the image of the object. By properly adjusting the external field strength, the colloid grains will be "flipped" by the unscattered photons, but not "flipped" by the scattered photons which will have lost some of their energy in the process of being scattered.

By the same token, the system can be "erased" in that all of the grains in the detector or any part of the detector can be returned to their metastable superconducting state by reducing the external magnetic field in any desired part of the detector below the critical value required to maintain them in their normal conducting state.

Thus the present system is highly efficient in detecting incident radiation. Therefore it is able to produce high quality images with minimum exposure of the object being examined. Further, the system detector can have a very large area so that the system can produce an image of a large object all at once. Also since the detector actually accumulates and stores events caused by incoming photons, the system is independent of data processing time limitations despite the high instantaneous photon flux involved. Finally, the present system acquires and stores the information needed to produce an image very quickly so that the quality of the image can be ascertained substantially immediately. This permits faster processing in the radiology laboratory and minimizes patient waiting time.

BRIEF DESCRIPTION OF THE DRAWINGS

For a fuller understanding of the nature and objects of the invention, reference should be had to the following detailed description taken in connection with the accompanying drawings in which.

DESCRIPTION OF THE PREFERRED EMBODIMENT

Figure 1:
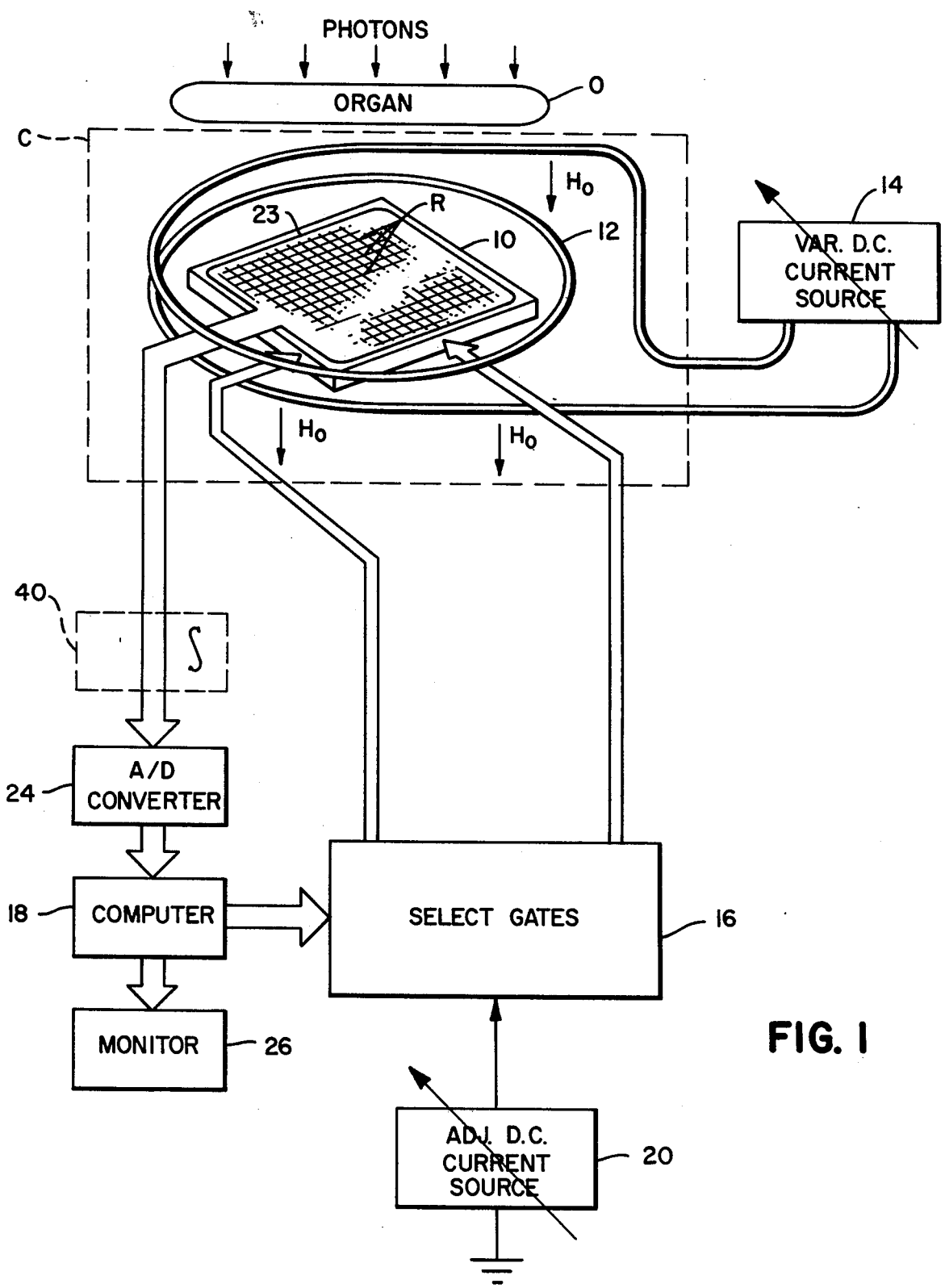
FIG. 1 is a block diagram of radiation imaging system made in accordance with this invention.

Referring first to FIG. 1 of the drawings, the present diagnostic imaging system comprises a detector 10 which is illuminated by radiation that has passed through an organ O. The detector is contained within a cryostat shown in dotted lines at C so that it is maintained at a very low temperature, say, that of liquid helium. The detector 10 is also subjected to an external magnetic field $H_0$ of several hundred gauss that is produced by a coil 12 encircling the detector and connected to a variable current source 14. The illustrated detector 10 is a large area body with the field $H_0$ being perpendicular to the body.

The detector 10 is divided into a multiplicity of resolution elements R. Photons travelling in straight lines through organ O enter detector 10 and produce events in one or another of the resolution elements R, with the number of events occurring in each resolution element being dependent upon the number of the photons entering that resolution element. That number is, in turn, dependent upon the densities of the tissue, bone, fluid, etc. along the paths through the organ O followed by those particular photons.

The system also includes a set of select gates 16 controlled by a computer 18 which addresses or selects each resolution element R and applies SELECT signals from an adjustable current source 20 to the selected resolution elements in the manner to be described later. The event information stored in the selected resolution element R is thereupon read out as a voltage pulse by a sensing coil 23 on the surface of the detector 10. The amplitude of the pulse is proportional to the number of grains reset and hence to the number of photons incident on the selected element R and that pulse is applied by way of an analog-to-digital converter 24 to computer 18 where it is stored in the computer memory. The event information contained in each of the other resolution elements is read out of detector 10 in the same manner and stored in computer 18. After all of the resolution elements have been interrogated or scanned by the gates 16, the computer 18 contains data reflecting the intensity pattern of the radiation illuminating the entire detector. This information can then be used to control a monitor 26 to provide an electronic display of an image of the organ O.

Thus the detector 10 is arranged and adapted to interact with a very high percentage of the incident photons to produce events, the number of which and the location of which are stored indefinitely by the detector 10. Then by addressing the select gates 16 these detector locations are interrogated and the radiation intensity data for each resolution element read into computer 18 where it is immediately available to produce a display on monitor 26. Thus the present system can produce in one step a high quality image of a relatively large object in a minimum amount of time.

Figure 2:
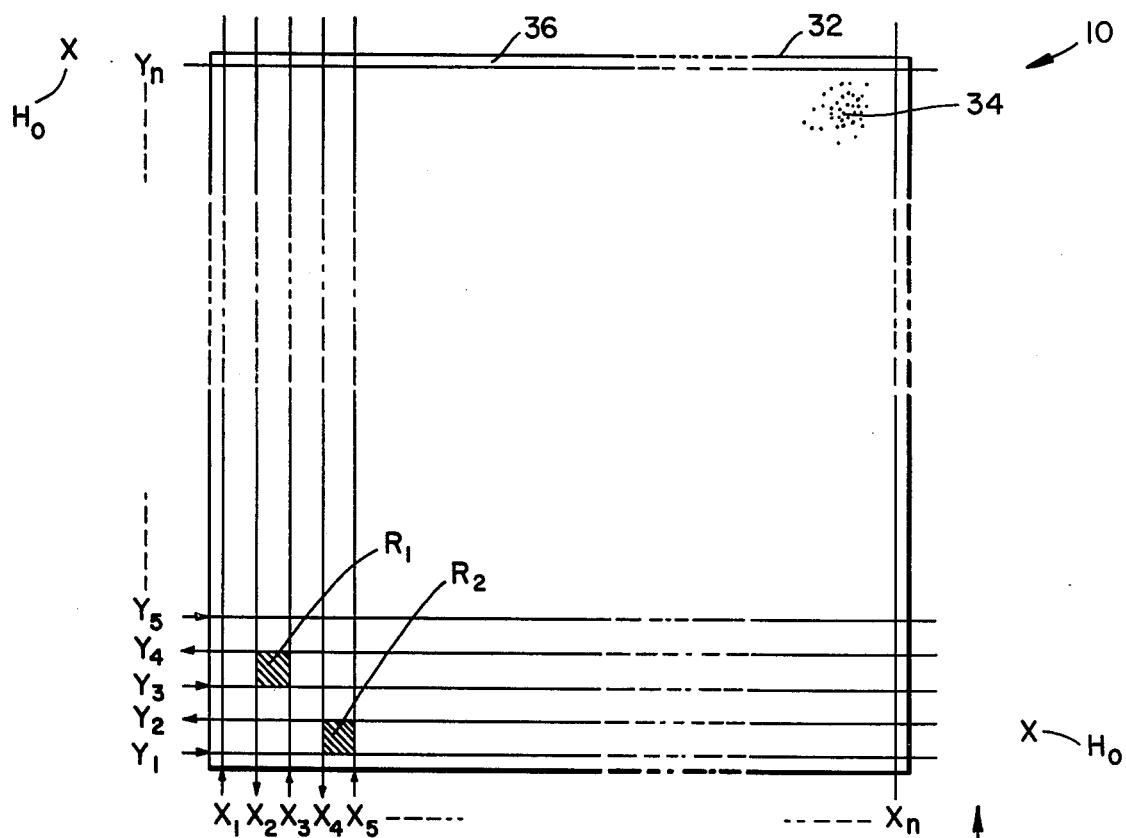
FIG. 2 is a diagrammatic view of the detector used in the FIG. 1 system.
Figure 2A:
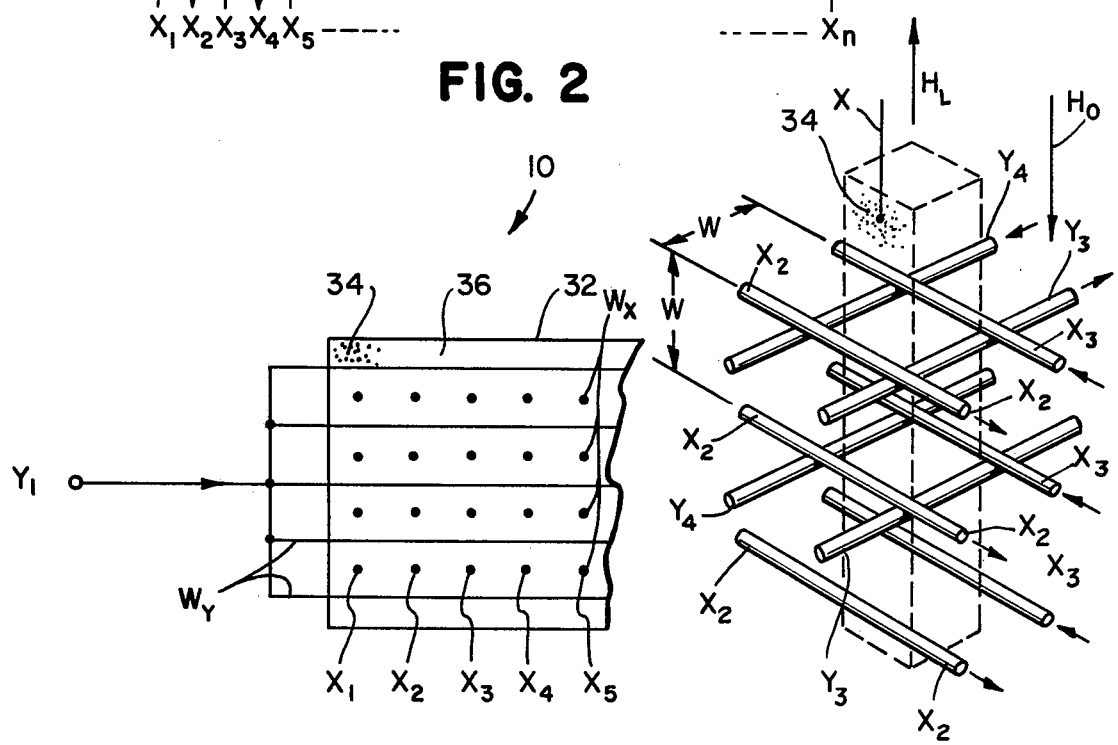
FIG. 2A is a fragmentary sectional view of the FIG. 2 detector.

Turning now to FIGS. 2 and 2A, the illustrated detector 10 comprises a generally rectangular slab 32 having substantial extent in both X and Y directions, typically on the order of 40cm. Also slab 32 has appreciable height or thickness (i.e. the Z direction), typically 3mm to 5mm. Slab 32 is composed of a multiplicity of very small grains 34 of dense superconducting material such as lead or tin. The grains are suspended in a relatively rigid binder 36 of low atomic number such as epoxy resin or a plastic material. Typical grain sizes are of the order of tens of microns and about 30% to 50% of the volume of slab 32 is composed of such grains.

Imbedded in the slab 32 are orthogonal, interlaced sets of long, narrow select wires. The wires of one set are uniformly spaced along the length of the slab. These wires are designated $X_1, X_2, X_3, \ldots X_n$. Each of these wires extends the full width of the slab and as best seen in FIG. 2A is composed of several separate wires $W_x$ arranged in a stack and connected in parallel so that when it is connected to a current source, the wire stack effectively provides a current sheet which extends substantially the entire thickness of the slab 32. The other set of wires, designated $Y_1, Y_2, Y_3, \ldots Y_n$ is arranged along the width of the slab, with each wire extending substantially the entire length of the slab. In the second set, each wire is also really a stack of wires $W_y$ that can provide, in effect, a current sheet which extend substantially the full thickness of the slab. The two sets of select wires thus intersect one another and their stacked wires $W_x$, $W_y$ are interlaced thereby dividing the slab 32 into the volumetric resolution elements R.

Thus two pairs of adjacent select wires, one pair from each set, uniquely define the address or coordinates of each resolution element R in the slab 32. For example, the resolution element $R_1$ is defined by select wire pairs $X_2, X_3$ and $Y_3, Y_4$. Likewise, the resolution element $R_2$ is defined by wire pairs $X_4, X_5$ and $Y_1, Y_2$.

A typical detector embodiment has 2000 wires in each set. The wire spacing is on the order of 0.2 mm. Usually, also, the number of wires $W_x$, $W_y$ in each stack is selected so that no grain 34 is further away from the plane of a wire pair from each set than ¼ the wire spacing W, i.e. 0.1 mm. Thus in a detector comprising a slab 32 that is five millimeters thick, each wire $X_n$, $Y_n$ should consist of a stack of 26 wires $W_x$, $W_y$ spaced 0.2 mm apart.

Figure 3:
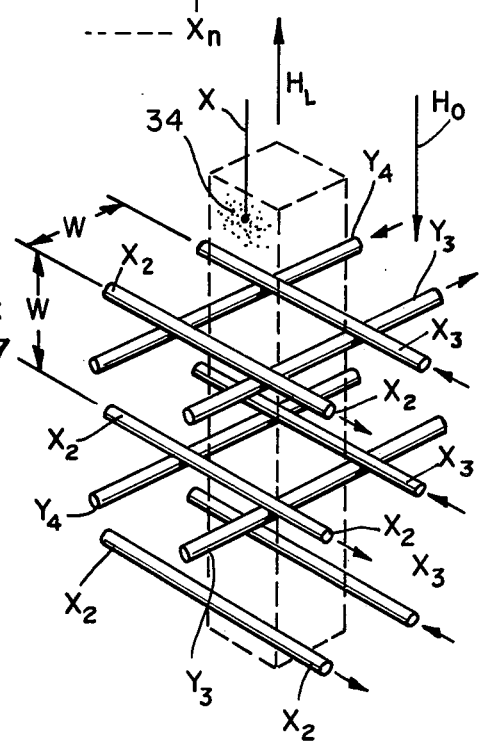
FIG. 3 is a fragmentary diagrammatic sectional view on a larger scale of the FIG. 2 detector.

Referring now to FIGS. 2 and 3, with detector 10 contained in cryostat C, the temperature of the colloid grains 34 is maintained below the critical value at which those grains can become superconducting. Also the detector is subjected to the external magnetic field $H_0$ whose strength is such as to maintain the grains in a metastable superconducting state in the absence of incident radiation. With grains 34 in their superconducting state, the external magnetic field $H_0$ is excluded from the grain interiors because of the Meissner effect. That phenomenon occurs because of screening currents in each grain which produce a magnetic dipole moment in each grain that precisely cancels the magnetic field in the grain interior.

When a photon X (FIG. 3) passes into slab 32 it usually interacts with one or another of the grains 34 therein due to the thickness of the body 32. This results in an energy transfer to the grain which occurs in a time that is quite short compared with the thermal relaxation time of the grain. As a result, the temperature of the grain rises, the exact amount depending upon the incident photon energy and the grain size. Since at the low temperatures involved here the specific heat of the grain is extremely small, the temperature rise can be large enough to raise the temperature of the grain above the critical temperature, i.e. that temperature above which it can no longer remain superconducting. Resultantly, the grain makes a quick (e.g. 100 nsec) transition or "flip" to the normal conducting state. The process is much like the photographic processing in which any photon above some minimum energy which strikes a film grain causes the entire grain to change.

Over the period during which the organ O is exposed to radiation, photons emerging from the organ enter the detector and cause many of the colloid grains 34 to "flip" to their normal conducting state. All of the "flipped" grains remain in that state so long as the low temperature and external magnetic field $H_0$ are maintained. Thus the number of "flipped" grains in each resolution element R is an indication of the intensity of the radiation incident on that resolution element. Furthermore, the distribution of the "flipped" grains across the detector reflects the distribution of the radiation intensity emanating from organ O which, in turn, is a reflection of the composition of the organ.

In effect, then, the distribution of the "flipped" grains in the detector constitutes a latent x-ray image of the organ O. In order to develop this latent image, the total number of grains in each resolution element that made the transition from the superconducting state to the normal conducting state must be determined. In the present system, this is accomplished by interrogating the resolution elements R in the detector.

As best seen in FIG. 3, each resolution element, e.g. element $R_1$, comprises a volume in the shape of a rectangular parallelopiped that is bounded by segments of a unique pair of select wires and that extends substantially the full thickness of the colloid body 32. Thus, in the illustrated example, the resolution element $R_1$ is bounded by wires $X_2$, $X_3$ and $Y_3$, $Y_4$. Actually, only a few of those wires are shown in FIG. 3 for ease of illustration. In fact, the wires are in stacks that extend substantially the entire thickness of body 32, providing, in effect, vertical current sheets.

Each resolution element is interrogated by addressing the select gates 16 (FIG. 1) so as to apply coincident currents from source 20 to the select wires defining the coordinates of that resolution element. Thus in FIG. 3, select gates 16 are actuated to apply coincident currents (typically 1 amp.) to wire pairs $X_2$, $X_3$ and $Y_3$, $Y_4$ which are additive to one another as shown by the arrows at the ends of those wires. Furthermore, the current direction is such as to produce a local magnetic field $H_L$ that bucks or opposes the external magnetic field $H_0$. The field $H_L$ is sufficiently strong that the net field ($H_0-H_L$) in resolution element $R_1$ is less than the threshold value required to maintain the grains 34 in that element in their normal conducting state so that they revert to their superconducting state. In other words, upon the application of the coincident currents, the select wires simulate a solenoid having an approximately uniform magnetic field throughout the entire volume of resolution element $R_1$ so that all of the grains 34 in that element are subjected to the same net field which resets them, while the grains in the adjacent resolution elements are not so affected.

Each such grain that is reset suffers a change in its permeability due to the Meissner effect discussed above which produces a flux change in the vicinity of the grain. The flux change, in turn, induces a voltage pulse in the sensing coil 23. Of course, the more grains in resolution element $R_1$ that are in a condition to be reset, the greater the flux change and the stronger the signal induced in the sensing coil 23. The resultant signal is digitized in converter 24 and stored in computer 18 at a memory location therein corresponding to the address of the resolution element $R_1$. The sensed signals are on the order of hundreds of microvolts which are readily detected by standard amplifiers and A/D converters.

The remaining resolution elements R are interrogated sequentially in the same way by applying coincident currents to the appropriate pairs of select wires $X_n$, $X_n+1$ and $Y_n$, $Y_n+1$ thereby resetting any normal conducting grains in those elements to their superconducting state. The resultant flux changes produce sensed signals reflecting the numbers of reset grains in the elements and thus the numbers of photon interactions in those elements, which signals are digitized and stored in the appropriate computer memory locations. Thus after all of the resolution elements have been interrogated, the computer memory contains all of the information required to display an x-ray image of the organ O.

The sensing coil 23 may be a single coil on the surface of body 32 as shown in FIG. 1. In this event, its radius should be larger than the thickness of slab 32 if it is to sense events throughout the slab. More preferably, it consists of an array of long coils, connected in parallel, typically 1cm wide and oriented at 45° with respect to the select wires $X_n$ and $Y_n$. With this arrangement, all resolution elements R now reside within the sensitive volume of a sensing coil, i.e. within a distance of ½ of the coil width.

Actually the instantaneous output signal on the sensing coil 23 when each resolution element is interrogated is the sum of the signal due to the reset transitions of the grains in that resolution element and a background signal which is inductively coupled in from the select wires $X_n$, $X_n+1$ and $Y_n$, $Y_n+1$. By integrating the signal on the sensing coil prior to digitizing it, the contribution from the background may be essentially eliminated since it sums to zero. Such an integrator is shown in dotted lines at 40 in FIG. 1. The integrated signal is then proportional to the number of grains in the resolution element which were reset into the superconducting state and hence to the number of photon interactions in that resolution element.

It should be noted also that in the case of the present system, the photon threshold energy, i.e. the energy required to "flip" a colloid grain from its superconducting to its normal conducting state depends upon the grain size and strength of the external magnetic field $H_0$. Thus for a given grain size by varying the external field $H_0$, the threshold energy can be varied accordingly. It has been demonstrated that the region of energy between no grains flipping and essentially all grains flipping may be controlled to within 5% of the threshold energy. This phenomenon enables the present system to be made unresponsive to photons which have been scattered upon passing through organ O and which therefore have a lower energy upon reaching the detector 10.

By appropriately selecting the value of the external field $H_0$, only the unscattered photons will have sufficient energy to flip the colloid grains to their normal conducting state. The ability of the present system to discriminate between scattered and unscattered incident photons enables it to produce an x-ray image which is unusually distinct and free of blurring. By the same token, by briefly interrupting the field $H_0$ or reducing it below the critical value, all the flipped grains can be reset to their superconducting state so that the detector 10 is effectively erased in preparation for reuse.

In a system used for diagnostic radiology applications, a resolution on the order of 0.2mm is acceptable. This requires that there be on the order of 2000 select wires in each set. However, by using conventional coding or grouping techniques, the number of wires required to drive the select wires can be significantly reduced to a number equal to $2\sqrt{N}$ where N is the number of select wires, i.e. to about 90 in the present example.

It will be seen from the foregoing then that the present imaging apparatus should constitute a valuable diagnostic tool in that it can produce radiation images immediately of large organs and other objects. Since the quantum detection efficiency of the system is quite high, high quality images can be obtained in a minimum amount of time and with minimum exposure of the patient to potentially harmful radiation.

Furthermore, because of the unique storage capability of its detector, the present system is able to respond to the very high instantaneous photon flux commonly found in radiology applications so that the resultant images are reasonably accurate. Also, unlike conventional detectors, this device is capable of a wide dynamic range which reduces the probability of having to repeat the examination because of an improper exposure. This, in turn, limits the patient exposure to potentially harmful radiation. Finally, by adjusting the external magnetic field to which the detector is subjected, the present imaging system can be made responsive only to incident radiation of a selected energy level and can be erased.

It will thus be seen that the objects set forth above, among those made apparent from the preceding description, are efficiently attained and that certain changes may be made in the above construction without departing from the scope of the invention. Therefore, it is intended that all matter contained in the above description or shown in the accompanying drawings be interpreted as illustrative and not in a limiting sense.

It is also to be understood that the following claims are intended to cover all of the generic and specific features of the invention herein described.

What is claimed is:

1. A radiation imaging system comprising
   A. a colloid body composed of small grains of a relatively dense superconducting material suspended in a binder, said body being positioned to be illuminated by photons incident from a selected direction,
   B. a cryostat for maintaining the temperature of the grains below the value at which they can become superconducting,
   C. means for applying a magnetic field to the body whose strength is above the critical value that maintains the grains in a metastable superconducting state in the absence of said radiation, each said grain assuming its normal conducting state upon interaction with an incident photon,
   D. at least two sets of select wire pairs in the body, the wires in the one set intersecting the wires in the other set so that unique pairs of wire pairs, one from each set, define the coordinates of resolution elements in the body,
   E. means for interrogating a selected resolution element by applying coincident currents to the wire pairs defining the selected resolution element, the direction and magnitude of said currents creating a net magnetic field in the selected resolution element that is less than said critical value so that normal conducting grains in the selected resolution element revert to their superconducting state and produce a flux change in the selected resolution element whose magnitude is proportional to the number of photons incident upon the selected resolution element, and
   F. means for detecting the flux change.

2. The system defined in claim 1 and further including means for adjusting the external magnetic field strength so that the grains will assume the normal conducting state only in resonse to interactions with photons above a selected energy level.

3. A system defined in claim 1 wherein each select wire is layered comprising a stack of wires, extending in the selected direction.

4. The system defined in claim 1 and further including
   A. means for interrogating the remaining resolution elements in the body and detecting the corresponding flux changes,
   B. means responsive to the flux changes for producing signals representing the number of photon interactions in the corresponding resolution elements, and
   C. means responsive to said signals for producing an image of the intensity pattern of the radiation illuminating the body.

5. The system defined in claim 1 and further including means for momentarily reducing the magnetic field strength below the critical value so as to reset normal conducting grains in the body to the superconducting state so as to "erase" the system.

6. The system defined in claim 1 wherein said body is a slab having relatively large extents in first and second directions and whose extent in the selected direction is sufficient to enable the slab to stop a high percentage of the incident photons.

7. The system defined in claim 6 wherein
   A. the select wires in one set are
      (1) imbedded in the slab,
      (2) spaced along the slab length, and
      (3) extend the width of the slab,
   B. the select wires in the other set are
      (1) imbedded in the slab,
      (2) spaced along the slab width, and
      (3) extend the length of the slab, all of the select wires being multiply layered forming wire stacks so that the wires in one set intersect and are interlaced with the wires in the other set thereby dividing the slab into resolution elements in the form of rectangular parallelepipeds.

8. The system defined in claim 7 wherein each wire in each wire stack extends substantially the full thickness of the body.

9. The system defined in claim 1 wherein
A. each wire pair is elongated with a selected wire spacing, and
B. the distance between adjacent wire layers in the wire stacks is less than the said wire spacing.

10. The system defined in claim 1 wherein the detecting means comprise one or more sensing coils supported by the body in which signals are induced in response to flux changes in the body.

11. The system defined in claim 10 and further including means for integrating the signals in the sensing coils.

12. The system defined in claim 1 wherein the interrogating means include
A. a current source, and
B. means for selectively connecting the current source to selected ones of said wire pairs in sequence.

* * * * *